April 24, 1956     R. NEUSCHOTZ     2,742,938
LOCK NUT COMPOSED OF SPLIT SLEEVE THREADEDLY
ENGAGED IN AN OUTER SHELL MEMBER
Filed March 27, 1953     4 Sheets-Sheet 1
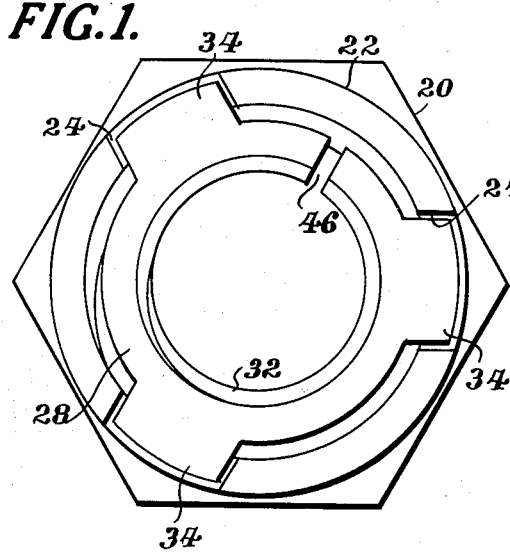
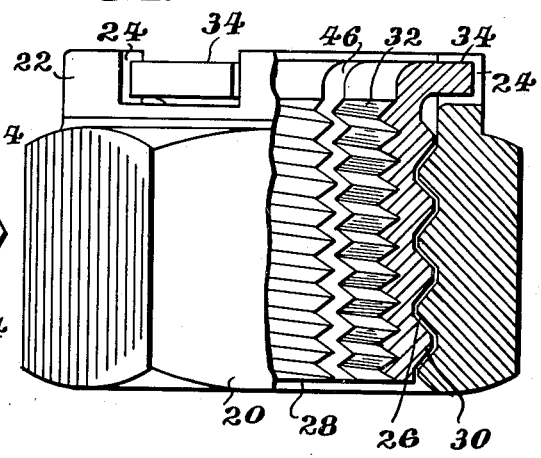
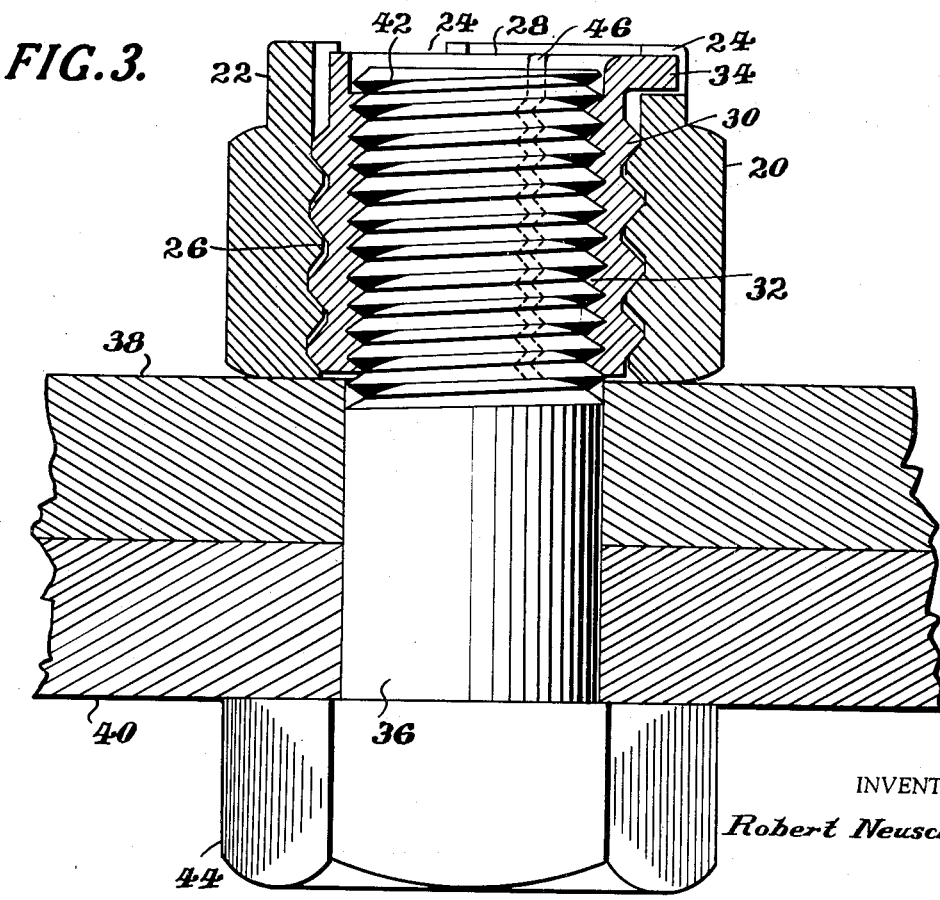
INVENTOR
Robert Neuschotz
BY Cushman, Darby & Cushman
ATTORNEYS April 24, 1956 R. NEUSCHOTZ 2,742,938
LOCK NUT COMPOSED OF SPLIT SLEEVE THREADEDLY
ENGAGED IN AN OUTER SHELL MEMBER
Filed March 27, 1953 4 Sheets-Sheet 2
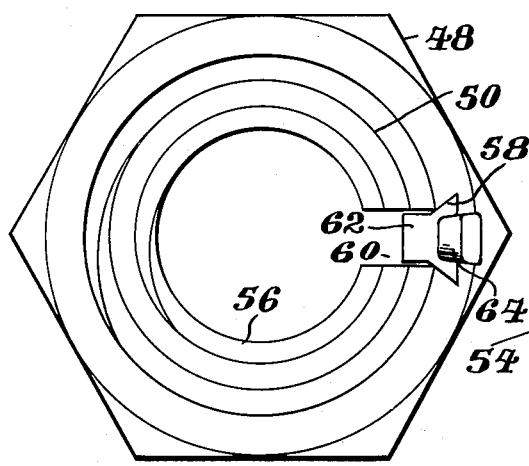
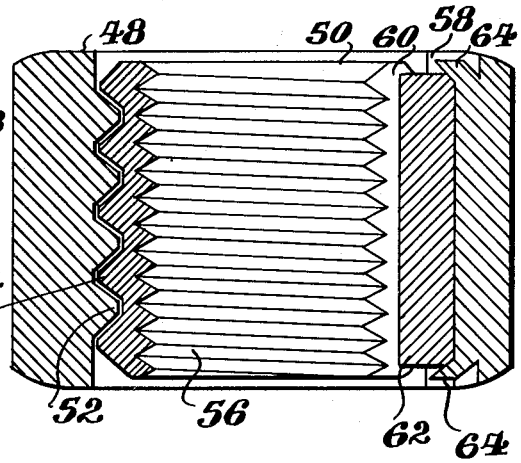
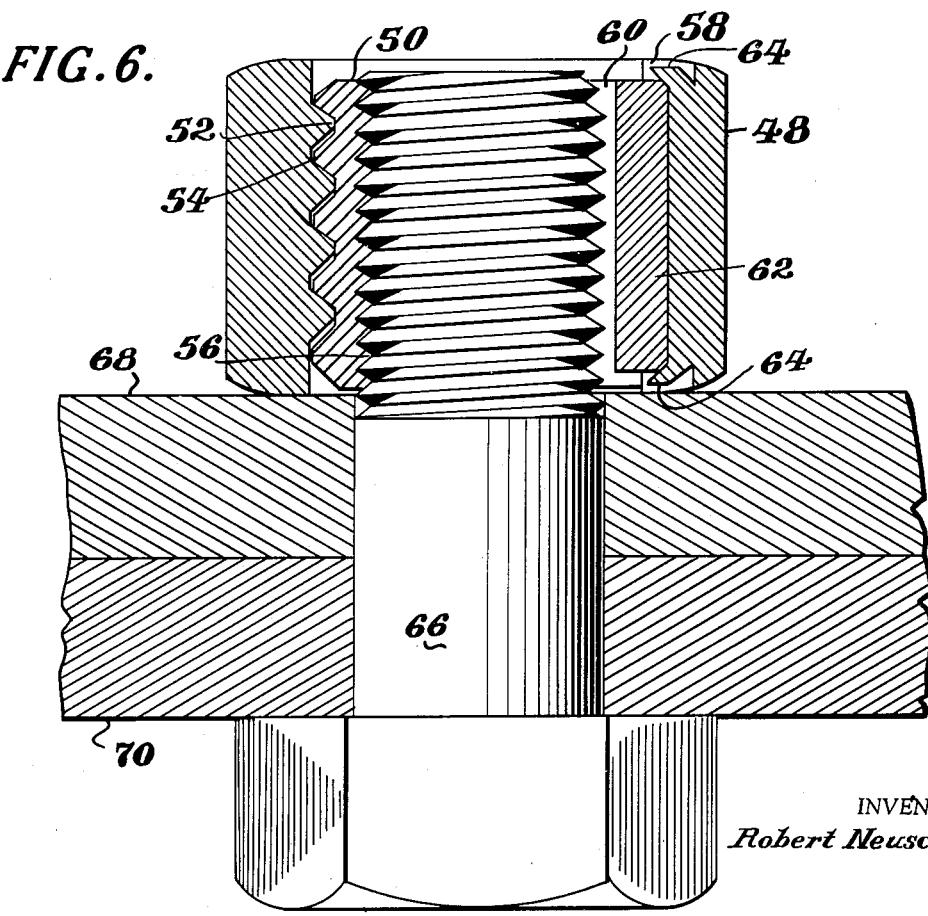
INVENTOR
*Robert Neuschotz*
BY
*Cushman, Darby + Cushman*
ATTORNEYS April 24, 1956  R. NEUSCHOTZ  2,742,938
LOCK NUT COMPOSED OF SPLIT SLEEVE THREADEDLY
ENGAGED IN AN OUTER SHELL MEMBER
Filed March 27, 1953  4 Sheets-Sheet 3
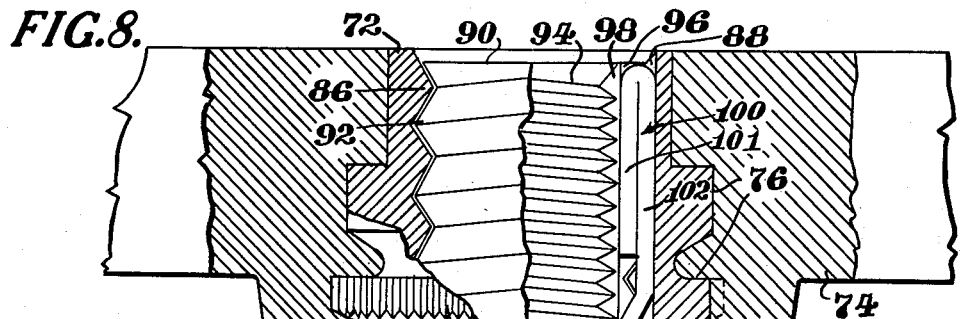
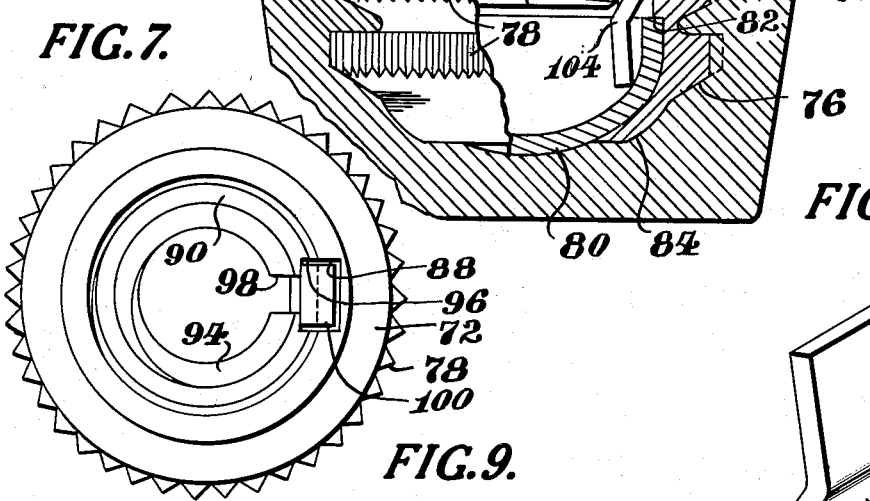
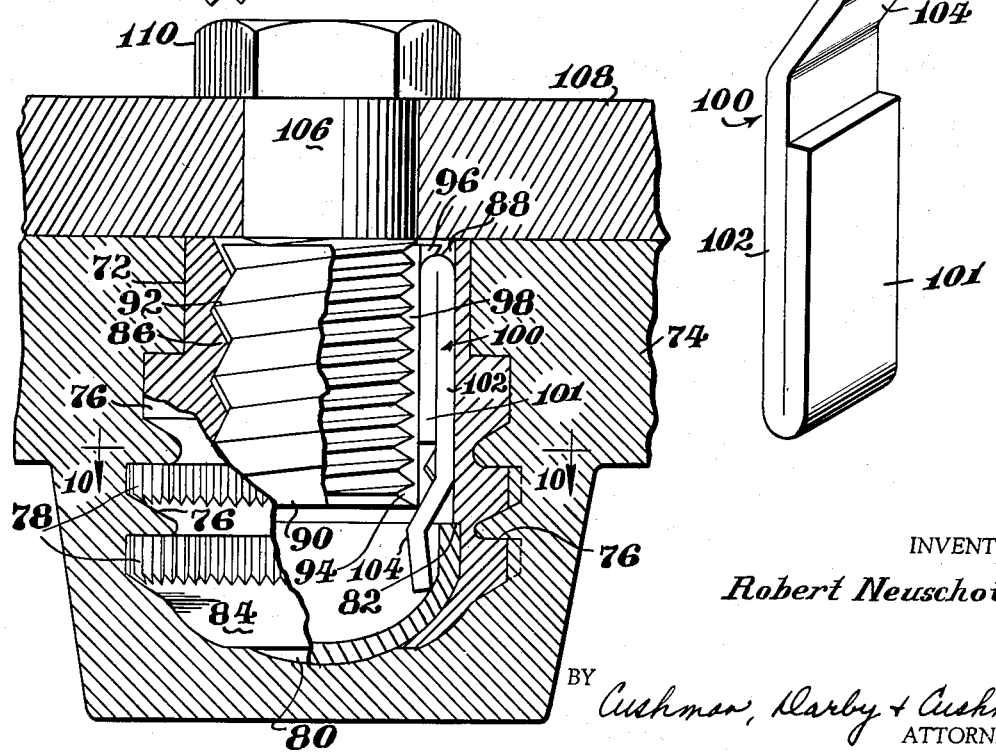
INVENTOR
*Robert Neuschotz*
BY *Cushman, Darby & Cushman*
ATTORNEYS

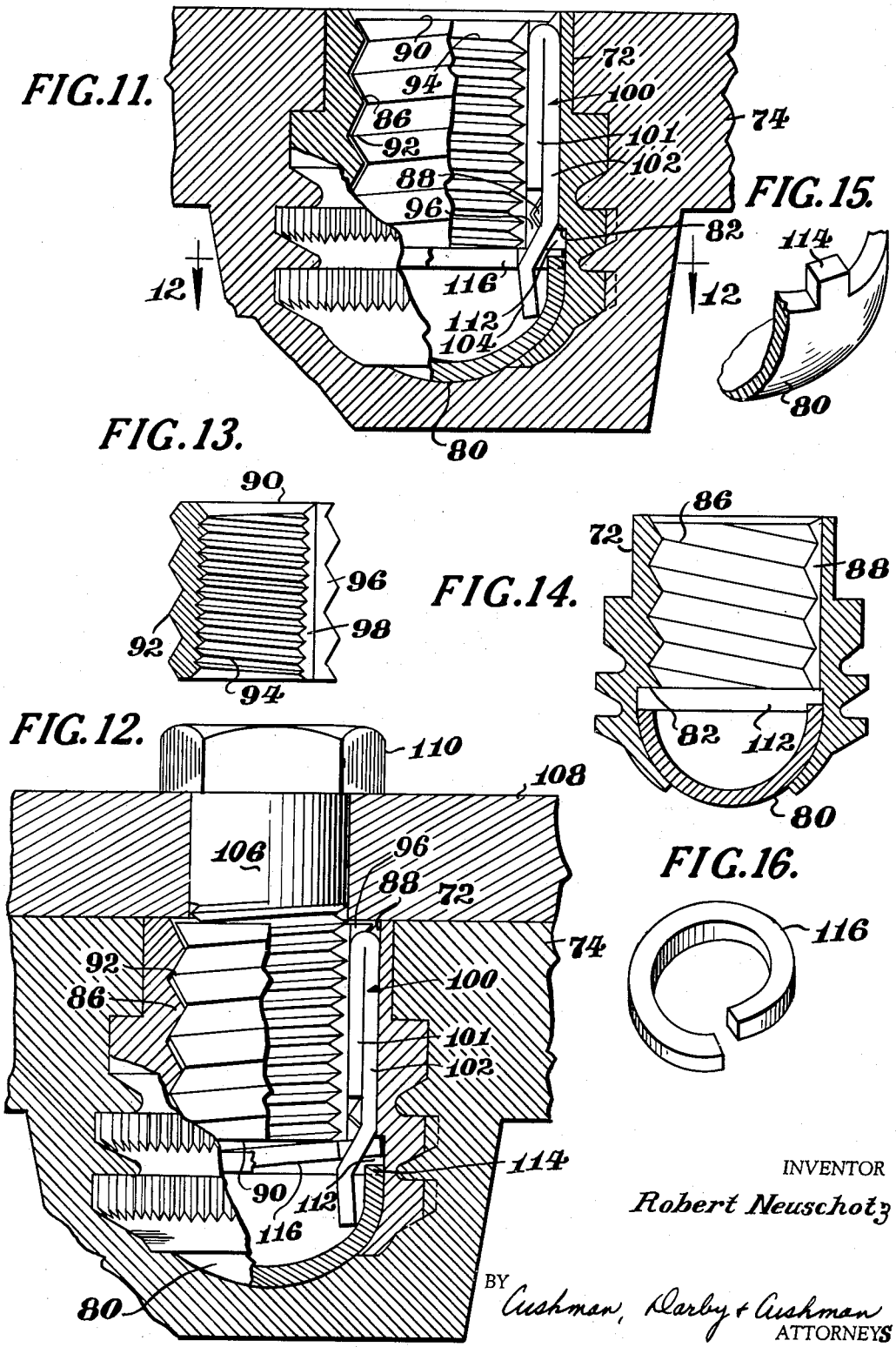

United States Patent Office 2,742,938
Patented Apr. 24, 1956

2,742,938

LOCK NUT COMPOSED OF SPLIT SLEEVE THREADEDLY ENGAGED IN AN OUTER SHELL MEMBER

Robert Neuschotz, Los Angeles, Calif.

Application March 27, 1953, Serial No. 345,187

20 Claims. (Cl. 151—19)

This invention relates to lock nuts and more particularly to an improved lock nut of the type having a longitudinally-split interiorly-threaded sleeve enclosed within an outer shell, relative longitudinal displacement between the shell and sleeve, effected by a bolt threaded into the sleeve and placed in tension, being effective to contract the sleeve into tight gripping engagement with the bolt.

Prior lock nuts of the type under consideration have only a relatively narrow annular area of engagement between the split sleeve and the enclosing shell. Hence, if a bolt is threaded only partially into a lock nut of this type, without extending past the aforementioned annular area of engagement, and placed under tension, a longitudinal section of the shell is placed under the same tension. Since the sleeve is usually of relatively thin side wall construction, such tension may possibly break the same. Further, prior art lock nuts of this type may be termed "uni-directional," in that the bolt may be introduced into only one end of the nut to obtain the desired locking effect.

It is known to compress the interior sleeve of lock nuts of this type to actually distort the same sufficiently to relatively lightly grip a bolt threaded therein, even without longitudinal tension being applied to the bolt. This is an advantageous situation since, even if the nut is unscrewed somewhat on the bolt, vibration will not cause the nut to readily and freely unscrew itself from the bolt. The above-mentioned distortion of the interior sleeve is effected for only a part of the length of the sleeve so that the bolt will readily enter a few threads with a free running fit before becoming gripped lightly by the distorted area of the sleeve. This bolt-gripping action because of the sleeve distortion is known as "prevailing torque." A lock nut having a prevailing torque has obvious advantages, but it would be still more advantageous to be able to free a bolt from a prevailing torque so that it could be unscrewed readily from the lock nut without having the holding and slowing effect of a continuous prevailing torque.

This invention also pertains to insert nuts designed to provide anchorage for screwthreaded connecting members, such as bolts, in bodies of relatively soft materials or materials that are physically unsuited for the direct anchorage of a screwthreaded connecting member therein. In particular, the aircraft industry employs vast quantities of relatively soft aluminum and magnesium alloys, as well as various plastics and woods. The problems of providing secure connections or anchorages to such bodies presents a number of difficulties, especially in aircraft construction where the fastening is subjected to constant vibration, yet positive assurance must be had that the anchorage will not loosen and fail either by longitudinal displacement or by rotation. In addition to the firm anchorage of an insert nut in the body of relatively soft material, it is extremely desirable, because of the aforementioned vibration, to provide means for securely locking a bolt in the insert nut.

Further, certain types of insert nuts are cast or molded into bodies of relatively soft material and cannot readily be replaced, in case the threads thereof are damaged, without almost completely destroying the structural member in which the nut is embedded.

It is, therefore, an object of this invention to provide a lock nut of the type under consideration wherein longitudinal displacement between the exterior shell and the interior sleeve, i. e., by means of a bolt threaded thereinto, will exert a constricting bolt-gripping effect on the sleeve for substantially the entire length thereof.

It is another object of this invention to provide an improved lock nut of the type under consideration which has a greatly increased area of engagement between the interior sleeve and the exterior shell.

It is another object of this invention to provide an improved lock nut into either end of which a bolt may be introduced and still obtain the desired locking effect.

It is another object of this invention to provide an improved lock nut of the type under consideration with means for providing the nut with a prevailing torque, which means is readily releasable to free a bolt from the prevailing torque.

It is another object of this invention to provide an insert lock nut.

It is another object of this invention to provide an insert lock nut of the cast-in type in which the entire inner sleeve is readily and easily replaceable.

It is a further object of this invention to provide an improved insert lock nut which has a readily-releasable prevailing torque.

Other objects and advantages of the invention will become apparent from the following description and accompanying drawings in which:

Figure 1 is an end view of a lock nut embodying this invention.

Figure 2 is a side view, partially in vertical section, of the lock nut shown in Figure 1.

Figure 3 is a longitudinal sectional view of the lock nut shown in Figure 1 showing its use with a bolt to secure two members together.

Figure 4 is a view corresponding to Figure 1, but illustrating a modified form of a lock nut embodying this invention.

Figure 5 is a longitudinal sectional view of the lock nut shown in Figure 4.

Figure 6 is a view corresponding to Figure 3, but showing the lock nut illustrated in Figure 4.

Figure 7 is an end view of an insert lock nut embodying this invention.

Figure 8 is a side view, partially in longitudinal section, illustrating the insert lock nut shown in Figure 7 molded into a body of material.

Figure 9 is a view corresponding to Figure 8, but showing a bolt threaded into the lock nut to secure a member to the body of material.

Figure 10 is a perspective view of the removable key shown in Figure 8.

Figure 11 is a view corresponding to Figure 8, but illustrating a modified form of insert lock nut embodying this invention which has a releasable prevailing torque.

Figure 12 is a view corresponding to Figure 9, but illustrating the insert lock nut shown in Figure 11.

Figure 13 is a longitudinal sectional view of the lock nut sleeve shown in Figure 11.

Figure 14 is a longitudinal sectional view of the lock nut shell shown in Figure 11.

Figure 15 is an enlarged fragmentary view of a portion of the insert shell shown in Figure 11.

Figure 16 is a perspective view of the split pressure ring shown in Figure 11.

Referring now to the drawings, there is shown in Figures 1 and 2 a lock nut embodying this invention. The lock nut comprises an outer shell 20 having the exterior thereof of conventional six-sided or hex configuration for engagement by a wrench (not shown). One end of the shell 20 is provided with an annular extension 22 of relatively short axial extent and having a plurality of radial slots 24 therein, three as shown in the drawings. The interior of the shell 20 is provided with a relatively coarse screwthread 26 having a relatively large thread angle, i. e., the angle included between the sides thereof. The crest and the root of the thread 26 may be flattened, as shown.

Enclosed within the shell 20 is a longitudinally-split sleeve 28 having an exterior thread 30 complementary to the interior thread 26 on the shell. The sleeve 28 normally is of an exterior diameter slightly less than the interior diameter of the shell 20, i. e., the major diameter of the sleeve thread 30 is slightly less than the major diameter of the shell thread 26, in order to provide a relatively loose fit therebetween for reasons hereinafter explained. The interior of the sleeve 28 is provided with a conventional bolt-receiving thread 32. The length of the sleeve 28 is somewhat less than the length of the shell 20.

The sleeve 28, at one end thereof, is provided with a plurality of outwardly-turned lateral or radially-extending ears 34 equal in number to the slots 24 in the shell extension 22 and received therewithin to prevent relative rotation between the sleeve and the shell 20. The width of the ears 34 is less than the width of the slots 24. The thickness of the ears 34, longitudinally of the sleeve 28, is less than the depth of the slots 24, and, when there is no longitudinal displacement between the exterior sleeve thread 30 and the interior shell thread 26, the sleeve ears are disposed substantially midway of the depth of the slots, as is best shown in Figure 2. In this same position of the shell 20 and sleeve 28, the end of the sleeve opposite the ears 34 is offset somewhat inwardly of the corresponding end of the shell, by the same amount that the ears are offset inwardly of the corresponding end of the shell extension 22, as is also illustrated in Figure 2.

Referring now to Figure 3, when the lock nut shown in Figures 1 and 2 is used in conjunction with a bolt 36, to secure two plate-like members 38 and 40 together, the bolt thread 42 engages the interior thread 32 in the sleeve 28 in a conventional manner and draws the nut toward the head 44 of the bolt until the exterior shell 20 abuts against the member 38. Further rotation of the bolt 36 or the nut causes the sleeve 28, because of the relative-rotation-preventing interengagement between the sleeve ears 34 and side walls of the slots 24 in the shell extension 22, to be relatively longitudinally displaced with respect to the shell, i. e., to be drawn downwardly with respect to the shell as shown in Figure 3. Such relative longitudinal displacement between the sleeve 28 and the shell 20 causes the interengagement between the inclined sides of the coarse threads 26 and 30 to effect a wedging action that constricts the sleeve, which can contract because of the split 46 therein, tightly about the bolt 36 to grip the latter with sufficient force so that the nut cannot readily become untightened by vibration or the like. In fact, it will be seen that the tighter the nut is rotated on the bolt, or the bolt rotated into the nut, the tighter the sleeve 28 will grip the bolt.

It also will be observed that the area of sleeve-contracting engagement between the shell 20 and the sleeve 28, i. e., the engaging inclined sides of the threads 26 and 30, extends in a spiral band around the entire length of the sleeve so that the latter is uniformly contracted for substantially its entire length into tight gripping engagement with the bolt 36. By reason of this latter feature, if the bolt 36 is threaded into the nut for only a few turns and tension applied to the bolt, that portion of the interior sleeve 28 engaged by the bolt will be placed under compression to thereby minimize any possibility of breaking the sleeve because of its relatively thin-wall thickness. For manufacturing convenience, the sleeve 28 is formed with the ears 34 extending substantially longitudinally thereof, so that the sleeve may readily be threaded into the shell 20 and, when in proper longitudinal position therein, the ears are bent over into their corresponding slots 24.

Referring now to Figures 4 and 5, there is shown a modified form of a lock nut embodying this invention which is provided with different means for preventing relative rotation between the exterior shell 48 and the interior longitudinally-split sleeve 50. In this modification of the invention, the shell 48 is again provided with an interior relatively coarse thread 52, of large thread angle, complementary to a corresponding exterior thread 54 on the split sleeve 50. The shell 48, however, is not provided with an annular longitudinal extension, corresponding to that shown in Figure 2, but both ends of the shell are plain. As with the first-described embodiment, the split sleeve 50 having the interior thread 56 is of a length somewhat less than the length of the shell 48, and, when the shell and sleeve are assembled as shown in Figure 5, and when there is no longitudinal displacement between their engaging threads 52 and 54, both ends of the sleeve are disposed at equal distances inwardly of the corresponding ends of the shell.

In order to prevent relative longitudinal rotation between the sleeve 50 and the shell 48, the interior of the shell is provided with an interior longitudinal keyway 58 registering with the relatively-wide split 60 in the sleeve. A key 62 is disposed in the keyway 58 and projects into the split 60 in the sleeve 50, but not beyond the root of the bolt-receiving thread 56. In order to prevent the key 62 from becoming displaced radially inwardly out of the keyway 58 and through the split 60 in the sleeve, the outer portion of the split in the sleeve may be wider than the inner portion thereof with the key formed complementary thereto. As best shown in Figure 4, however, the keyway 58 and that portion of the key 62 engaged therein have a dovetail fit so that the key cannot become radially-displaced relative to the shell 48. In order to prevent relative longitudinal displacement between the key 62 and the shell 48, the latter may be deformed at both ends of the keyway 58, as by upsetting, generally indicated at 64, in a manner commonly known as "staking," to retain the key in the keyway. Further, that portion of the key 62 projecting into the split 60 is narrower than the latter, as shown in Figure 4, so that the split may narrow without interference by the key and thus permit contraction of the sleeve 50. For the same reason, when more than one relative-rotation-preventing ear 34 is formed on the sleeve construction 28 shown in Figures 1 and 2, the width of such ears circumferentially of the sleeve 28 is less than the width of the corresponding slots 24 in the shell extension 22 so that the sleeve will be free to contract tightly about a bolt threaded thereinto. Quite obviously, a separate keyway (not shown) could be formed in the exterior of the sleeve 50 apart from the split 60 for registration with the shell interior keyway 58, but such construction is not preferred because it would tend to weaken the sleeve.

In use of the lock nut illustrated in Figures 4 and 5, relative longitudinal displacement between the sleeve 50 and the shell 48, by a bolt 66, drawing the nut downwardly until the shell engages one of two members 68 and 70 being bolted together, effects the same type of wedge-actuated bolt-gripping contraction of the sleeve 50 as is shown in the construction illustrated in Figure 3.

It will be seen that a bolt can be introduced into either end of both of the aforedescribed lock nuts with equally effective locking engagement.

Referring now to Figures 7 to 10, there is shown the application of this invention to a nut of the insert type which is designed to be cast or molded into a body of relatively-soft material that is not adapted for direct threaded engagement of an element therewith for a secure fastening. An insert nut embodying this invention comprises an outer shell 72 adapted to be cast into a member, such as the aluminum fuel cell flange 74, flush with the surface thereof. A plurality of exterior circumferential flanges 76 on the shell 72 engage within the material of the flange 74 to prevent pull-out. Three such flanges 76 are shown and two of these flanges, the innermost two shown in the drawings, are provided with a plurality of longitudinal serrations 78 for anti-rotational locking engagement with the body of material forming the flange 74. Thus, the shell 72 is securely locked with a large area of contact against rotational and longitudinal movement in the body of relatively-soft material forming the flange 74.

The inner end of the shell 72 is closed by a dome-shaped cap 80 which is telescopically received within the inner end of the shell and rests on an annular shoulder or ledge 82 formed in the latter. The inner end 84 of the shell 72, beyond the ledge 82, is of relatively thin-wall construction so that this portion of the shell can be swaged or spun over the peripheral portions of the cap 80, as shown, to hold the latter securely in place within the shell. Thus, the shell 72 may be cast or molded into the body of relatively-soft material forming the flange 74 without danger of the material flowing into the interior of the shell.

The shell 72 is provided with an interior thread 86 extending from the outer end of the shell to the inner ledge 82. The thread 86 is relatively-coarse and has a relatively-large and obtuse thread angle, preferably of the order of 120°. Further, the interior of the shell 72 is provided with a longitudinal keyway 88 extending the length of the thread 86, i. e., from the outer end of the shell to the inner ledge 82 therein.

Received within the shell 72 is a longitudinally-split sleeve 90 having an exterior thread 92 complementary to and engaging the interior shell thread 86. Preferably, the major overall diameter of the sleeve 90, i. e., at the crest of the thread 92, is slightly less than the major diameter of the interior shell thread 86 so that the sleeve has a somewhat loose fit within the shell 72. The sleeve 90 is provided with an interior conventional bolt-receiving thread 94, and the outer end of the sleeve is normally spaced somewhat inwardly of the outer end of the shell 72, as shown in Figure 8. The exterior of the sleeve 90 is provided with a longitudinally-extending keyway 96 registering with the interior keyway 88 in the shell. Preferably, the sleeve keyway 96 is formed at the outer side of the split 98 in the sleeve, both to prevent weakening of the sleeve and to permit withdrawal of a key, as later explained.

Disposed in the keyways 88 and 96 of the shell and sleeve is a key 100, preferably of spring steel, for reasons later explained. The key 100 is of slightly less width than the width of the sleeve keyway 96 in order to permit constriction of the sleeve 90 without interference from the key, as was heretofore explained with reference to the lock nut construction illustrated in Figures 4 and 5. The key 100 is conveniently formed by bending a strip of spring steel partially back upon itself to form a short leg 101 and a long leg 102 which extends beyond the inner end of the sleeve. The long leg of the key has an intermediate section 104 extending inwardly toward the sleeve 90 and an end section extending downwardly to project into the cap 80. The inclined surface of the intermediate section 104 of the long key leg is adapted to engage beneath the inner end edges of the sleeve 90 at the inner end of the keyway 96 therein to thus form a detent construction to prevent ready disengagement of the key from the keyways 88 and 96.

The use of this insert lock nut is shown best in Figure 9, wherein a bolt 106 extends through an appropriate aperture in a plate-like member 108 and is threaded into the insert sleeve 90 to secure the member 108 to the flange 74. As the bolt 106 is tightened, the sleeve 90 is drawn upwardly toward the head 110 of the bolt, and thus sleeve-constricting wedging engagement takes place between the complementary threads 92 and 86 on the exterior of the sleeve and the interior of the shell, in the same manner as in the lock nut constructions heretofore described, so that the harder the bolt 106 is tightened, the tighter will be the gripping action of the sleeve 90 thereon.

In the event that the inner bolt-engaging thread 94 on the sleeve 90 becomes damaged, or the sleeve becomes otherwise unfit for use, the inwardly-facing end of the long leg 102 of the key 100 may be engaged by an appropriate tool, such as a hook (not shown) inserted within the sleeve 90, and the key pushed partially outwardly from the registering keyways 88 and 96 to a position wherein the outer end of the key is accessible and may be gripped for complete withdrawal of the key. Thereupon, the sleeve 90 readily may be unscrewed from the enclosing shell 72 and replaced with an undamaged sleeve.

As has been heretofore mentioned, it is extremely desirable for a lock nut to have a prevailing torque, which torque should be readily releasable to enable rapid screwing and unscrewing of a bolt into and out of the lock nut without the hindrance of a prevailing torque. An insert lock nut having this feature is illustrated in Figures 11 through 16. The insert lock nut shown therein is of substantially the same construction as that illustrated in Figures 8 through 10, save that the rim of the cap 80 is spaced from the ledge 82 at the inner end of the shell 72, or the ledge spaced further from the inner end of the shell, to provide a relatively wide annular interior recess 112 between the end edge of the cap and the ledge in the shell. Further, the end edge of the cap 80 is provided with a tongue 114, shown best in Figure 15, which is aligned with the keyway 88 in the shell 72. Disposed in the annular interior recess 112 is a split ring spring, or pressure ring 116, shown best in Figure 16. The pressure ring 116 is of greater width in radial direction than the depth of the recess 112, but of less thickness than the width of the recess to enable the ring to expand and contract or flatten. The tongue 114 projects into the split in the ring 116 to prevent rotational movement thereof within the shell 72.

In assembling the insert lock nut parts, the split sleeve 90 is threaded into the shell 72 until the inner end of the sleeve contacts with and compresses and flattens the pressure ring 116 against the end edge or rim of the cap 80 and thereafter the key 100 is inserted in the registering keyways 88 and 96 with its inner detent end being accommodated within the split in the pressure ring 116.

From this construction, it will be seen that the pressure ring 116 constantly urges the split sleeve 90 outwardly with respect to the shell 72, as shown in Figure 12, but the ring is designed to have insufficient strength to effect sufficient relative longitudinal displacement between the sleeve and the shell to cause appreciable contraction of the sleeve. When a bolt 106 is screwed into the sleeve 90, however, and tightened sufficiently to tension the bolt, the aforementioned bolt-gripping contraction of the sleeve will occur as the bolt forcibly draws the sleeve outwardly with respect to the shell 72. This relative longitudinal movement between the sleeve 90 and shell 72 permits the pressure ring 116 to expand, as shown in Figure 12, so that even when the tension on the bolt 106 has been relieved, as by slightly unscrewing the same, the force of the pressure ring acting on the inner end of the sleeve is strong enough to maintain the sleeve in its bolt-gripping contracted condition, thereby providing a prevailing torque which is effective for the entire unscrewing withdrawal of the bolt. In the event that the prevailing torque is not desired, however, the outer end of the bolt 106, after the tension on the latter has been relieved as aforedescribed, may be tapped inwardly to thereby move the sleeve 90 inwardly and compress the pressure ring 116 while at the same time releasing the sleeve-constricting and bolt-gripping effect caused by the interengagement of the exterior sleeve thread 92 and the interior shell thread 86. Thereafter the bolt 106 will have a free-running action within the sleeve 90 without the aforedescribed prevailing torque being present.

It will thus be seen that the objects of this invention have been fully and effectively accomplished. It will be realized, however, that various changes may be made in the specific embodiments shown and described to illustrate the principles of this invention without departure from such principles. Therefore, this invention includes all modifications encompassed by the spirit and scope of the following claims.

I claim:

1. A lock nut comprising: an interiorly-threaded split sleeve provided with an exterior thread of uniform diameter and relatively large thread angle, both sides of said thread, in cross section, being inclined with respect to a plane perpendicular to the axis of said sleeve; a tubular shell coaxially enclosing said sleeve and having an interior thread complementary to said exterior sleeve thread for engagement therewith, said sleeve being axially shorter than said shell with both ends of said sleeve normally being spaced inwardly of the corresponding ends of said shell, relative longitudinal movement between said sleeve and shell in either direction serving to engage a side of said sleeve thread with the opposed side of said shell thread and produce a wedging action effective to contract said sleeve, interengagement of said thread sides being the sole means on said sleeve and shell effective to contract the former; and means having radially disposed interengageable faces for substantially locking said sleeve and shell against relative rotation in either direction.

2. The structure defined in claim 1 in which the sides of the sleeve thread are equally inclined.

3. The structure defined in claim 1 in which the locking means comprises: an interior keyway in the shell registering with the split in the sleeve; and a key in said keyway and projecting into said split.

4. The structure defined in claim 1 in which the locking means comprises: registering keyways on the interior of the shell and the exterior of the sleeve, respectively; and a key in said keyways.

5. The structure defined in claim 1 in which the locking means comprises: means defining at least one radial slot in one end of the shell; and a lateral ear on one end of the sleeve engaged in said slot.

6. The structure defined in claim 1 including resilient means operatively engaging the sleeve and shell and yieldingly urging relative axial displacement therebetween.

7. A lock nut comprising: an interiorly-threaded split sleeve provided with an exterior thread of uniform diameter and relatively large thread angle, both sides of said thread, in cross section, being inclined with respect to a plane perpendicular to the axis of said sleeve; a tubular shell coaxially enclosing said sleeve and having an interior thread complementary to said exterior sleeve thread for engagement therewith and an interior keyway registering with the split in said sleeve, said sleeve being axially shorter than said shell with both ends of said sleeve normally being spaced inwardly of the corresponding ends of said shell, relative longitudinal movement between said sleeve and shell in either direction serving to engage a side of said sleeve thread with the opposed side of said shell thread and produce a wedging action effective to contract said sleeve, interengagement of said thread sides being the sole means on said sleeve and shell effective to contract the former; a separate key in said keyway and projecting into said split, that portion of said key projecting into said split being narrower than the normal width of said split; and means for retaining said key in said keyway.

8. The structure defined in claim 7 in which the retaining means includes means defining a dovetail engagement between the keyway and the key and material-upsetting deformations in the shell at opposite ends of said keyway overlying the corresponding ends of said key.

9. A lock nut comprising: an interiorly-threaded split sleeve provided with an exterior thread of uniform diameter and relatively large thread angle, both sides of said thread, in cross section, being inclined with respect to a plane perpendicular to the axis of said sleeve and the outer portion of the split in said sleeve being wider than the inner portion of said split; a tubular shell coaxially enclosing said sleeve and having an interior thread complementary to said exterior sleeve thread for engagement therewith and an interior keyway registering with the split in said sleeve, said shell being axially longer than said sleeve with both ends of the latter normally being spaced inwardly of the corresponding ends of said shell, relative longitudinal movement between said sleeve and said shell in either direction serving to engage a side of said sleeve thread with the opposed side of said shell thread and produce a wedging action effective to contract said sleeve, interengagement of said thread sides being the sole means on said sleeve and said shell effective to contract the former; and a key in said keyway having a portion narrower than said split outer portion and projecting thereinto.

10. A lock nut comprising: an interiorly-threaded split sleeve provided with an exterior thread of uniform diameter and relatively large thread angle, both sides of said thread, in cross section, being inclined with respect to a plane perpendicular to the axis of said sleeve; means defining an outer longitudinal keyway in said sleeve at and wider than the split therein; a tubular shell coaxially enclosing said sleeve and having an interior thread complementary to said exterior sleeve thread for engagement therewith and an interior keyway registering with said sleeve keyway, said shell being axially longer than said sleeve with both ends of the latter normally being spaced inwardly of the corresponding ends of said shell, relative longitudinal movement between said sleeve and said shell in either direction serving to engage a side of said sleeve thread with the opposed side of said shell thread and produce a wedging action effective to contract said sleeve, interengagement of said thread sides being the sole means on said sleeve and said shell effective to contract the former; and a key in said keyways, said key being of less width than said sleeve keyway and of greater width than said sleeve split.

11. An insert lock nut adapted to be cast into a body of relatively softer material comprising: a tubular shell having a closed end, an open end, an interior thread of uniform diameter and relatively large thread angle, and exterior means for interlocking engagement with the body of material to prevent rotational and axial movement relative thereto, that side of said thread facing said closed end, in cross section, being inclined relative to a plane normal to the axis of said shell; an interiorly-threaded split sleeve having an exterior thread complementary to said shell interior thread for engagement therewith, said sleeve being axially shorter than said shell with that end of said sleeve adjacent said shell open end normally being spaced inwardly of the latter; and releasable means for locking said sleeve and said shell against relative rotation.

12. The structure defined in claim 11 wherein the locking means comprises: means defining registering keyways in the exterior of the sleeve and the interior of the shell, respectively, said sleeve keyway registering with the split in said sleeve; and a removable key in said keyways.

13. The structure defined in claim 12 including detent means for releasably retaining the key in the keyways.

14. An insert lock nut adapted to be cast into a body of relatively softer material comprising: a tubular shell having a closed end, an open end, an interior thread of uniform diameter and relatively large thread angle, an interior longitudinal keyway, and exterior means for interlocking engagement with the body of material to prevent rotational and axial movement relative thereto, that side of said thread facing said closed end, in cross section, being inclined relative to a plane normal to the axis of said shell; an interiorly-threaded split sleeve having an exterior thread complementary to said shell interior thread for engagement therewith and means defining an exterior longitudinal keyway at and wider than the split in said sleeve and registering with said shell keyway, said sleeve being axially shorter than said shell with that end of said sleeve adjacent said shell open end being normally spaced inwardly of the latter; and a key in said keyway, said key being of less width than said sleeve keyway and of greater width than said sleeve split.

15. The structure defined in claim 14 wherein the key has a resilient extension engageable with the inner end of the sleeve for releasably retaining said key in the keyways.

16. The structure defined in claim 14 wherein the key has an inner end accessible from within the sleeve for removal of said key from the keyways.

17. An insert lock nut adapted to be cast into a body of relatively softer material comprising: a tubular shell having a closed end, an open end, an interior thread of uniform diameter and relatively large thread angle, and exterior means for interlocking engagement with the body of material to prevent rotational and axial movement relative thereto, that side of said thread facing said closed end, in cross section, being inclined relative to a plane normal to the axis of said shell; an interiorly-threaded split sleeve having an exterior thread complementary to said shell interior thread for engagement therewith, said sleeve being axially shorter than said shell with that end of said sleeve adjacent said shell open end normally being spaced inwardly of the latter; releasable means for substantially locking said sleeve and shell against relative rotation; and resilient means for yieldingly urging relative axial displacement between said sleeve and shell in a direction to move the former toward said open end of the latter.

18. The structure defined in claim 17 in which the shell has an interior circumferential recess at the inner closed end thereof and the urging means comprises a split pressure ring disposed in said recess.

19. A lock nut comprising: an interiorly-threaded split sleeve provided with an exterior thread of uniform diameter and relatively large thread angle, both sides of said thread, in cross section, being inclined with respect to a plane perpendicular to the axis of said sleeve; a tubular shell coaxially enclosing said sleeve and having an interior thread complementary to said exterior sleeve thread for engagement therewith, said sleeve being axially shorter than said shell with both ends of said sleeve normally being spaced inwardly of the corresponding ends of said shell, relative longitudinal movement between said sleeve and shell in either direction serving to engage a side of said sleeve thread with the opposed side of said shell thread and produce a wedging action effective to contract said sleeve, interengagement of said thread sides being the sole means on said sleeve and shell effective to contract the former; and means for substantially locking said sleeve and shell against relative rotation in either direction.

20. An insert lock nut adapted to be cast into a body of relatively softer material comprising: a tubular shell having a closed end, an open end, an interior thread of relatively large thread angle, an interior longitudinal keyway, and exterior means for interlocking engagement with the body of material to prevent rotational and axial movement relative thereto, that side of said thread facing said closed end, in cross section, being inclined relative to a plane normal to the axis of said shell, said shell having an interior circumferential recess at the inner end of said interior keyway and a tongue in said recess aligned with said interior keyway; an interiorly-threaded split sleeve having an exterior thread complementary to said shell exterior thread for engagement therewith and means defining an exterior longitudinal keyway registering with said shell interior keyway; a key in said keyways and extending across said shell recess; and a split pressure ring in said recess, of less width than the latter, and with the split in said ring straddling said key, said ring being of a thickness in radial direction to bear against the inner side wall of said shell recess and the inner end of said sleeve to yieldingly urge the latter outwardly of said shell.

References Cited in the file of this patent

UNITED STATES PATENTS

| | | |
|---|---|---|
| 379,278 | Keating | Mar. 13, 1888 |
| 635,361 | Titus | Oct. 24, 1899 |
| 741,701 | O'Connor | Oct. 20, 1903 |
| 791,825 | Scudder et al. | June 6, 1905 |
| 894,875 | Bryce | Aug. 4, 1908 |
| 964,062 | Seddon | July 12, 1910 |
| 1,204,623 | Waller | Nov. 14, 1916 |
| 1,539,513 | Ross | May 26, 1925 |
| 1,597,698 | Tinker | Aug. 31, 1926 |
| 2,361,979 | Tarwater | Nov. 7, 1944 |
| 2,388,270 | Lord | Nov. 6, 1945 |
| 2,487,059 | Noyes | Nov. 8, 1949 |
| 2,545,045 | Rosan | Mar. 13, 1951 |
| 2,604,135 | Rydberg | July 22, 1952 |
| 2,627,293 | Le Boeuf | Feb. 3, 1953 |

FOREIGN PATENTS

| | | |
|---|---|---|
| 131,668 | Australia | Mar. 7, 1949 |
| 261,997 | Great Britain | Dec. 2, 1926 |
| 286,785 | Italy | June 22, 1931 |
| 564,228 | Great Britain | Sept. 19, 1944 |
| 628,316 | Great Britain | Aug. 26, 1949 |
| 659,767 | France | Feb. 11, 1929 |
| 923,412 | France | Feb. 17, 1947 |
| 932,677 | France | Dec. 1, 1947 |